R. LA FRANCE.
GLASS GATHERING AND SHAPING MACHINE.
APPLICATION FILED JULY 5, 1913.

1,185,687.

Patented June 6, 1916.
12 SHEETS—SHEET 1.

Fig. 1.

Witnesses
W. K. Ford
James P. Barry

Inventor
Richard LaFrance
By Whittemore Hulbert & Whittemore
Atty's

R. LA FRANCE.
GLASS GATHERING AND SHAPING MACHINE.
APPLICATION FILED JULY 5, 1913.

1,185,687.

Patented June 6, 1916.
12 SHEETS—SHEET 3.

Fig 3.

Witnesses
W. K. Ford
James P. Barry

Inventor
Richard La France
By ........ Attys

R. LA FRANCE.
GLASS GATHERING AND SHAPING MACHINE.
APPLICATION FILED JULY 5, 1913.

1,185,687.

Patented June 6, 1916.
12 SHEETS—SHEET 4.

R. LA FRANCE.
GLASS GATHERING AND SHAPING MACHINE.
APPLICATION FILED JULY 5, 1913.

1,185,687.

Patented June 6, 1916.
12 SHEETS—SHEET 7.

WITNESSES:

INVENTOR.
Richard La France
BY
ATTORNEY.

R. LA FRANCE.
GLASS GATHERING AND SHAPING MACHINE.
APPLICATION FILED JULY 5, 1913.

1,185,687.

Patented June 6, 1916.
12 SHEETS—SHEET 8.

WITNESSES:
W. K. Ford
James P. Barry

INVENTOR.
Richard La France
BY
ATTORNEY.

R. LA FRANCE.
GLASS GATHERING AND SHAPING MACHINE.
APPLICATION FILED JULY 5, 1913.

1,185,687.

Patented June 6, 1916.
12 SHEETS—SHEET 10.

UNITED STATES PATENT OFFICE.

RICHARD LA FRANCE, OF TOLEDO, OHIO, ASSIGNOR TO THE TOLEDO GLASS COMPANY, OF TOLEDO, OHIO, A CORPORATION OF OHIO.

GLASS GATHERING AND SHAPING MACHINE.

1,185,687.     Specification of Letters Patent.     Patented June 6, 1916.

Application filed July 5, 1913. Serial No. 777,449.

*To all whom it may concern:*

Be it known that I, RICHARD LA FRANCE, a citizen of the United States of America, residing at Toledo, in the county of Lucas and State of Ohio, have invented certain new and Useful Improvements in Glass Gathering and Shaping Machines, of which the following is a specification, reference being had therein to the accompanying drawings.

My invention relates to improvements in glass gathering and shaping machines, and is an improvement upon the type of machine known as the Owens bottle-blowing machine, shown in U. S. Letters Patent Nos. 766,768, dated August 2nd, 1904, and 870,664, dated November 12th, 1907.

The object of the invention is to simplify the construction, to reduce the vibration and to so construct the machine that it may be run at higher speed than has heretofore been practicable in such machines.

To this end, the invention consists in the construction, arrangement and combination of parts, as more fully hereinafter described and particularly pointed out in the claims.

Referring to the drawings.

I have not deemed it necessary to show all of the machines, such as the base and the driving mechanism, as they form no part of my present invention. As is well-known in such machines, there is a central standard, or pillar, around which a frame revolves, this frame carrying a series of like mechanisms. On some machines there are six and some ten of these mechanisms, which are duplicates, and inasmuch as they are duplicates I have deemed it necessary to describe only a single one of each, it being understood that a number can be added, to suit the particular work to be produced.

Figure 1:
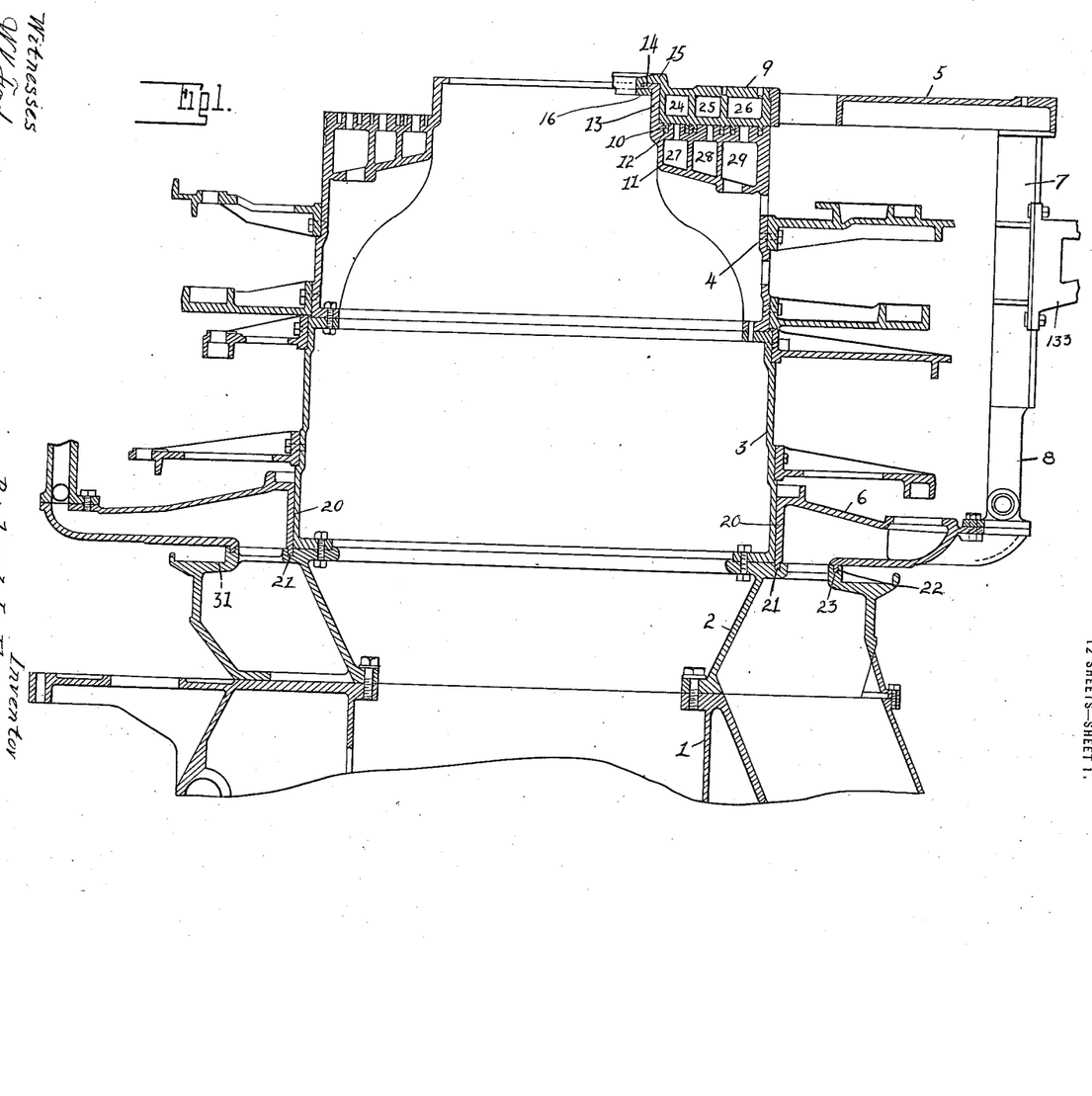
Figure 1 is a vertical central section through the machine frame, illustrating the central pillar or support and the revolving frame, the operating parts being removed.

The central pillar I have shown as composed of the base sections 1, 2, which are annular hollow sections, and the upper sections 3, 4. These are made in sections for convenience in manufacture, but in effect, when assembled, they form one single central support for the operating parts. The base sections 2 preferably extend outside of the plane of the upper sections, as is clearly shown in the drawings. Supported upon and rotating about this central pillar is a rotating frame, illustrated in Fig. 1, with the operating parts removed. This frame consists of an upper spider 5 and a lower annulus 6, connected by the posts 7 (one post for each set of mechanisms), the lower ends of the posts being of inverted U-shape, or bifurcated, the furcations, 8, being secured to the lower annulus 6 at the outer edge thereof. Secured to the inner edge of the upper spider is the ring 9, provided with circular ribs 10 on its lower face. This ring 9 rests upon a tubular bracket 11 formed at the top of the section 4 of the central pillar, which bracket, on its upper face, is provided with complementary grooves 12 for the ribs 10. The bracket 11 has an inner vertical flange 13 and terminates in horizontal flanges 14. The ring 9 bears against the vertical flange 13 and has a lateral flange 15 extending over the lateral flange 14 of the pillar, and a ring, 16, is secured to the flange, 15, by suitable bolts (not shown). At the bottom the annulus 6 is provided, at its inner edge, with a vertical circular flange 20 which, at its lower edge, engages with a groove, 21, in the lateral extension of the section 2 beyond the section 3 of the pillar; and on the bottom of the annulus 6, spaced from the flange 20, is a second annular rib, 22, engaging a groove, 23, in the top of the section 2.

The construction thus far described comprises the general frame work of the rotating frame and the means by which that rotating frame is supported and held upon the central stationary pillar.

The upper ring 9 is provided with annular chambers 24, 25 and 26, which are arranged above annular chambers, 27, 28 and 29 in the bracket 11; the purpose of these two sets of annular chambers being to form air, gas and vacuum passages, as will be more fully hereinafter described.

Secured to the underface of the annulus 6 is a circular rack-bar 30 which travels in a guide-way 31 on top of the section 2 of the pillar; with which the pinion 32 engages, this pinion being upon the shaft 33 which is driven by any suitable mechanism and causes the frame described to rotate about the pillar, carrying with it the mechanism attached to the rotating frame.

In the specific embodiment of my invention as herein shown, I have illustrated the mechanism for gathering and forming a hollow-necked bottle, such as the ordinary beer bottle.

There is a frame which raises and lowers on the rotating frame, which I call the dipping-frame, as it carries the gathering mold to and from the molten glass so that the mold may be filled and withdrawn when filled.

The mold in which the blank is formed comprises a neck-mold and a body-blank mold, each made in sections, and a cut-off knife for severing the string of glass depending from the gathered glass in the blank. Mechanism is also provided for opening and closing the mold sections and for raising and lowering the plunger which forms the initial blow-opening in the blank; for opening and closing the valves for producing a vacuum to effect the gathering and later for opening and closing an air-valve for blowing the blank; and for raising and lowering the dipping-frame at any desired points in its travel.

Figure 4:
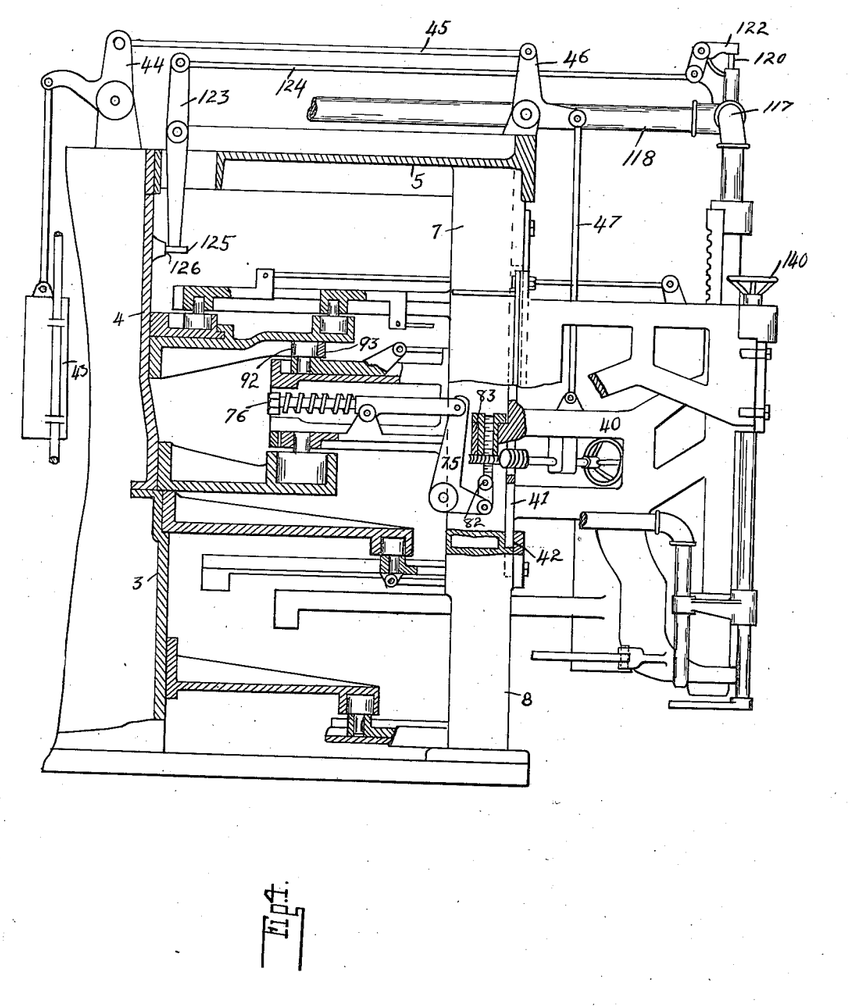
Fig. 4 is a sectional elevation of the rotary frame and dipping frame, with some of the parts removed and broken away.
Figure 6:
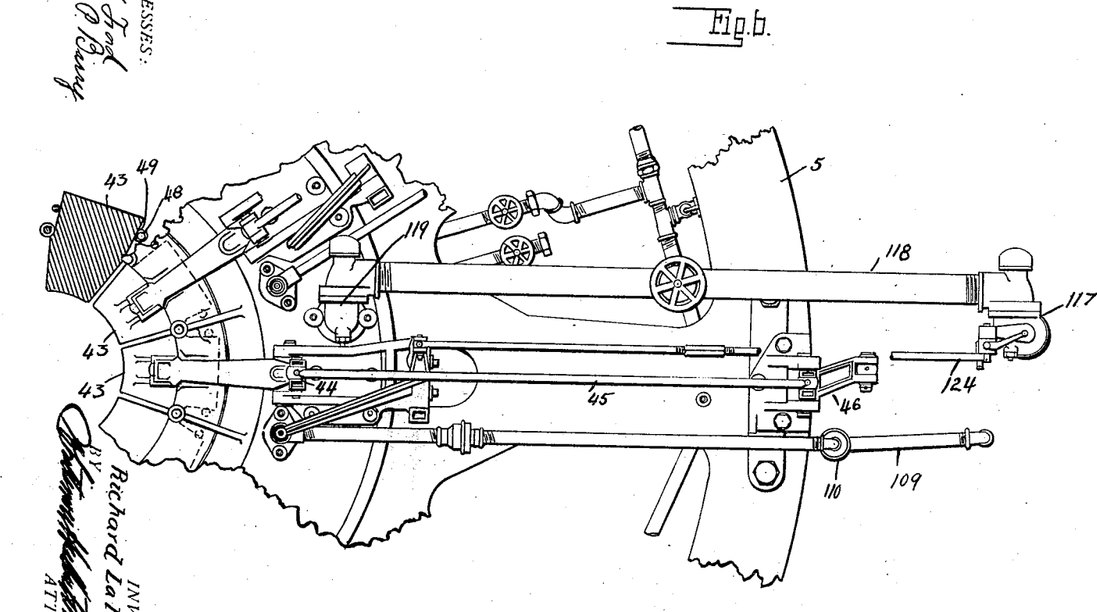
Fig. 6 is a top plan view of a section of the rotary frame, through the central column and operating parts.

The dipping-frame 40 is shown in Fig. 4 and is provided at its inner edge with guide-bars, 41, which are adapted to slide in suitable guide-ways, 42, on the outer face of the posts 7 above the furcations 8. This frame 40 is counterbalanced by weights, 43, within the pillar, suspended from a bell-crank, 44, which is connected by a rod, 45, to the bell-crank, 46, at the front of the revolving frame, and by a rod, 47, with the dipping-frame. As shown in Fig. 6, these weights are wedge-shaped in cross-section and are provided with lateral ears, 48, which are apertured to engage a slide upon the rods 49, in their vertical movement. By making them wedge-shaped they may be arranged in a compact circle upon the inside of the pillar and by guiding them on the rods, they are prevented from swaying in the revolution of the machine.

Figure 18:
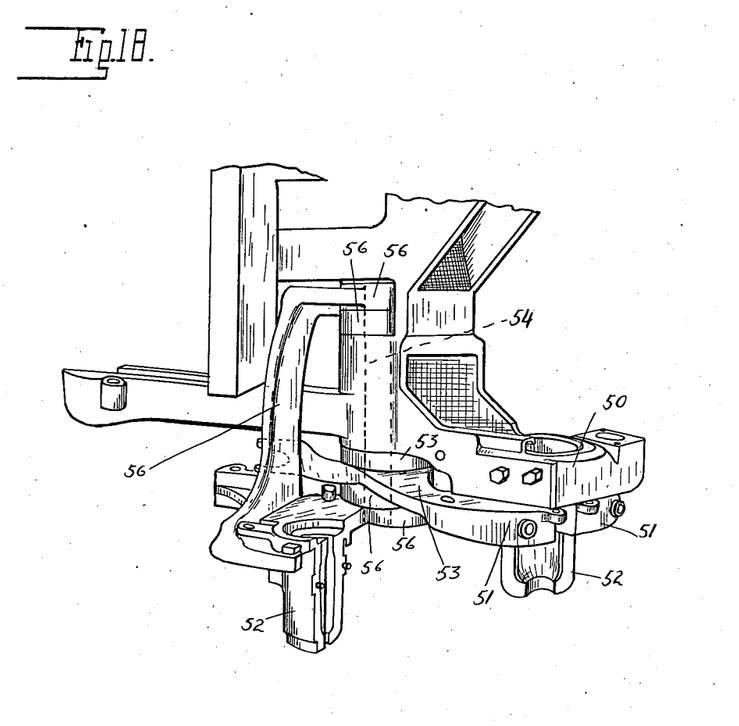
Fig. 18 is a perspective view of the lower portion of the dipping-head, showing most of the parts removed but illustrating the construction of the arms supporting the neck-mold and the body-blank mold.

The dipping-frame, at its lower end, is provided with a lateral projection forming the dipping-head, 50, below which sectional neck-molds, 51, and body-blank molds, 52, are arranged. The neck-mold sections are attached to the outer ends of arms, 53, which are pivoted on a pin, 54, supported in the dipping-frame and extending above and below the plane of the head 50. The two neck-mold arms, 53, are pivoted below the plane of the head and carry at their outer ends the neck-mold sections, 51. The body-blank molds are carried upon the bifurcated arms, 56, the lower furcations of which are pivoted at the lower end of the pin 54 below the plane of the head 50, and the upper furcations of which are pivoted at the upper end of the pin and above the plane of the head, as plainly shown in Fig. 18. These arms 56 carry suitable body-blank molds, 52.

Figure 12:
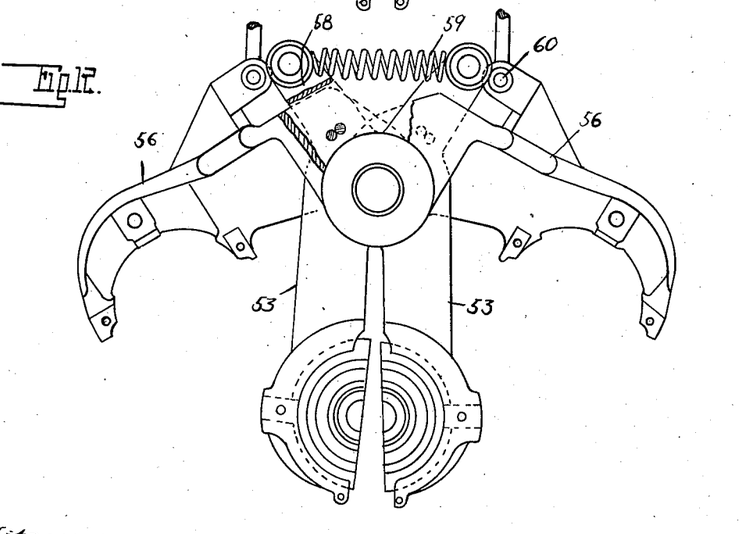

The arms 53 have an extension, 58, inward from the pin 54 and between the inner ends thereof is a spring, 59, tending normally to hold the neck-mold sections tightly together. On the blank-mold arms, 56, are suitable pins, 60, which, when the blank-molds are open to the desired degree, will strike similar pins on the extensions 58, compress the spring and open the neck-molds, as shown in Fig. 12.

Figure 2:
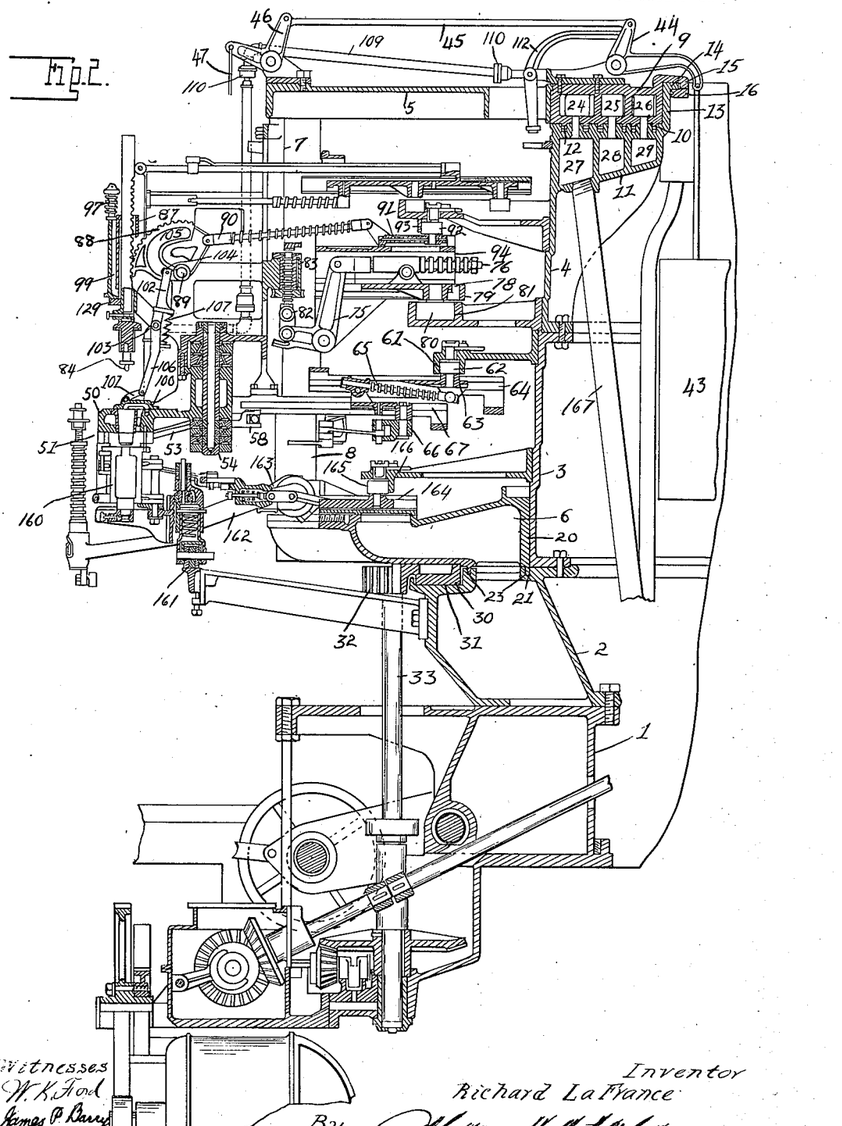
Fig. 2 is a section similar to Fig. 1, with the operating parts of one side of the machine shown in position, the parts being in position as when the bottle is being blown in the blow-mold.

The blank-molds are opened and closed by means of a cam, 61, carried on the pillar, with which a roller, 62, engages (Fig. 2). This roller is carried on a slide, 63, engaging in a slide-way, 64, secured to the post 7, and is connected by a rod, 65, pivoted at its outer end with a slide, 66, engaging in a slide-way, 67, secured to the lower end of the dipping-frame, as plainly shown in Fig. 2. The rod 65 permits of the up-and-down movement of the slide 67 in relation to the slide 63.

Figure 13:
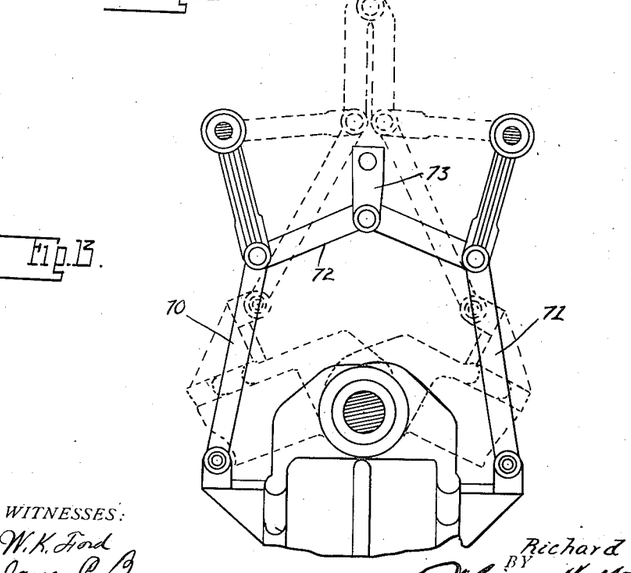
Fig. 13 is a diagrammatic plan showing in dotted lines the different positions of the actuating devices for the body blank-mold.

Connected to each of the blank-mold arms are toggle links, 70, 71 (Fig. 13), which are connected at their joint by links, 72, to a link, 73, which is in turn connected to the slide-block 66; arranged so that the inward and outward movement of the roller 62 will, through the connections described, open and close the blank-molds at the proper time and through the connections described will, at the extreme movement of the blank-mold, also open the neck-mold.

By the construction described I am enabled to pivot both the neck and the blank molds upon the same pivot, and by operating the neck-molds from the blank-molds I am enabled to simplify and condense the mechanism.

The dipping-frame is raised and lowered by means of a bell-crank 75, pivoted on the post 7, one arm of which is connected to a link, 76, which is pivotally supported upon a slide-block 78, moving in a slideway 79 carried by the post 7. This slide-block has a roller, 80, running in a cam-way 81, carried by the pillar, by which the bell-crank is rocked upon its pivot. The other end of the bell-crank 75 is pivotally connected to a link, 82, which has a screw-threaded adjustment, as shown at 83, with the dipping-frame; so that the up-and-down movement of the dipping-frame may be adjusted to any desired plane within the range of adjustment.

Figure 3:
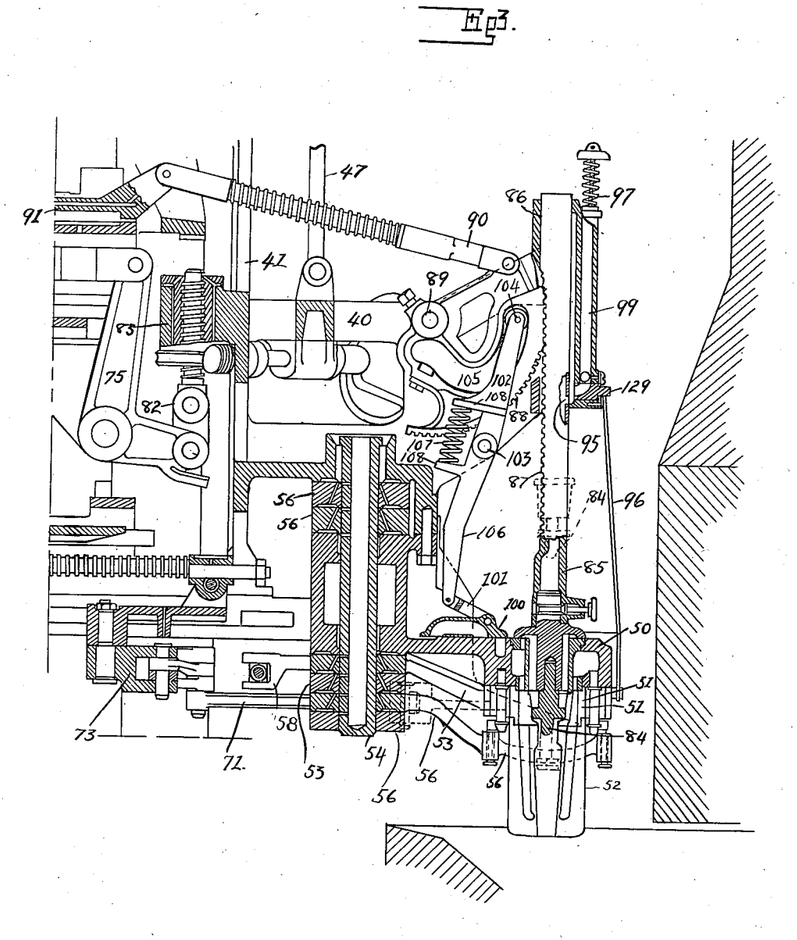
Fig. 3 is a section on the same line as Fig. 2, through the blank-mold and operating parts therefor, showing the parts in position when the blank-mold is being charged with glass from the tank and with parts broken away or sectioned for the purpose of illustration.

As is usual in machines of this kind, a pin or core is provided which enters the neck-mold and makes what is called the initial blow-opening during the gathering of the blank and then is withdrawn when the article is blown. This pin, or plunger, I have shown in full and dotted lines at 84, Fig. 3. It is secured upon the lower end of a plunger-rod, 85, which is supported slidingly in a bearing, 86, formed at the outer end of the dipping-frame 40; and it is provided upon its inner face with a rack, 87, with which a gear segment, 88, pivoted at 89 on the dipping-frame, engages. This gear segment is rocked about its pivot by a link, 90, which is connected with a slide-block, 91, sliding in a slide-way 94 secured to the posts 7 and provided with a roller, 92, engaging a cam-way, 93, secured to the pillar.

It is obvious that the rocking of the segment about its pivot will raise and lower the plunger-rod 85 and with it the pin or plunger 84 at the lower end thereof, into the blank-mold and away therefrom, at the desired time controlled by the shape of the cam 93. The plunger is cooled by air from a pipe, 98, connected with a suitable source of air-supply and connecting into the top of a passage-way 99 formed in the dipping-head beyond the plunger-rod 85. This passage-way, or pipe, 99, is provided at its lower end with branches, 127, which terminate in inwardly-projecting nozzles, 128, adapted to direct jets of air upon opposite sides of the plunger in its elevated position. At the lower end of the passage-way 99 is a plug-valve, 129, having an inclined passage therethrough, so that air may be admitted around the plunger-rod 85 and also therein through a port, 95; or, by turning the plug in the proper direction, this air may be cut off.

Figure 7:
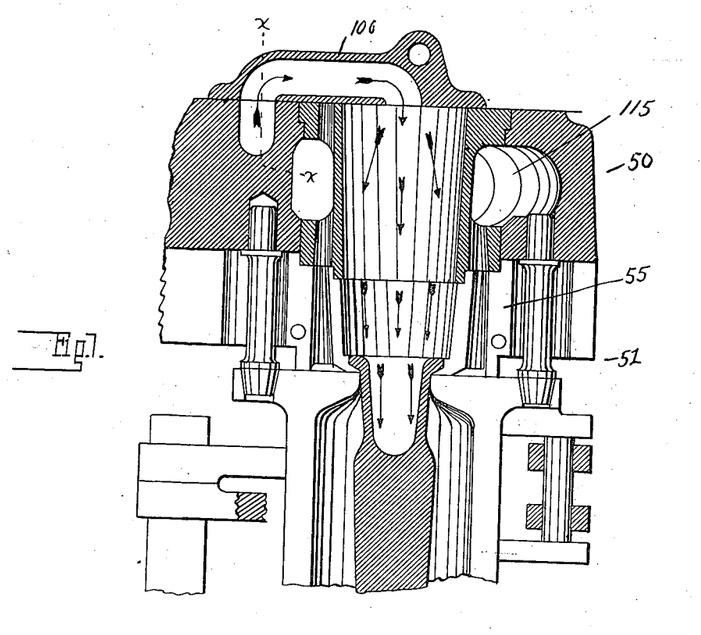
Fig. 7 is an enlarged vertical central detail section upon the same plane as Fig. 2, showing the parts in position for blowing the blank.
Figure 8:
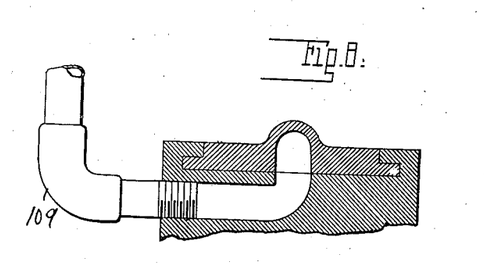
Fig. 8 is a section on the plane of line X—X of Fig. 7.
Figures 14, 15:
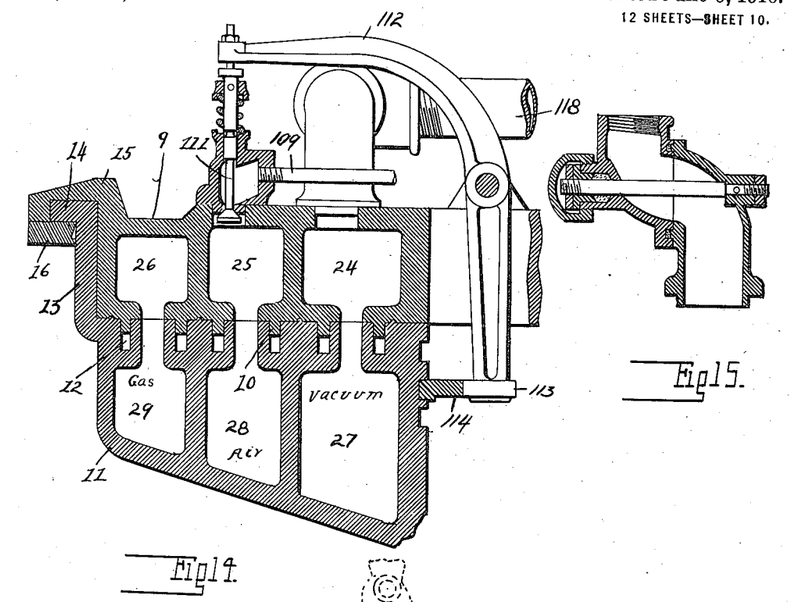
Fig. 14 is an enlarged section through the top ring of the stationary pillar or post, as illustrated in Fig. 1, showing the air-valve lever.
Fig. 15 is a section through one of the swivel joints in the pipe connection.

96 are tension rods extending from the neck-mold sections 51 to an upper point on the dipping-head and acting through springs, 97, to yieldingly hold the neck-mold sections tightly against the dipping-head 50, so as to maintain a tight joint. Carried on the dipping-head is an air-valve, 100, sliding in bearings in and out to shut off the air supply for blowing or to connect the interior of the neck-mold with the air-supply, for blowing. This valve is connected by a link, 101, with the lower end of a lever, 102, pivoted at 103 on the dipping-head, and its upper end having a wrist, 104, engaging a cam-way, 105, in the rocking gear segment 88. The lower arm, 106, of this lever is pivoted to the upper arm and the two sections are held yieldingly together by means of a spring, 107, between shoulders, 108, on the two lever arms, so that in case the valve should strike any obstacle, such as broken glass, or anything else, it can yield and not break the parts. The air for blowing is supplied through a pipe, 109, which leads into the side of the blowing-mold and is made to communicate by suitable passages when the valve 100 is shifted outwardly, with the interior of the blow-head and the mold, in the well-known manner and as clearly shown in Figs. 3, 7 and 8. When the valve is withdrawn, this passage is shut off. The pipe 109 is provided with suitable flexible joints, 110, and is connected into the air-chamber 25, as shown in Fig. 15, the connection to the pipe being controlled by a spring-pressed valve, 111, which is opened by means of a curved lever, 112, having a roller, 113, at its end, bearing on a cam, 114, on the outside of the pillar.

Figure 5:
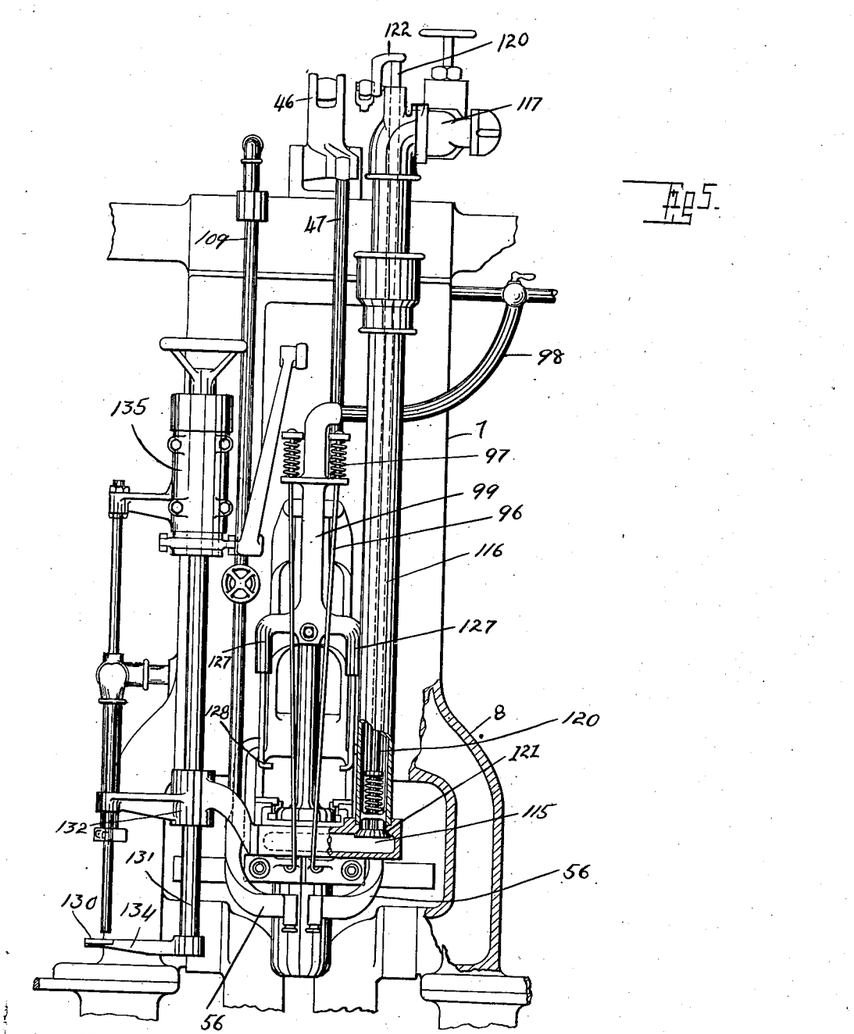
Fig. 5 is a front elevation of one of the dipping frames and portions of the rotary frame.

The vacuum connection, shown in Fig. 5 and Fig. 6, comprises a chamber, 115, in the dipping-head, which chamber leads to one side thereof, and is connected to a vertical pipe, 116, which, at its upper end, is connected by a suitable swivel joint, 117, with a horizontal pipe 118. At the inner end, this horizontal pipe is connected by a universal joint, 119, with the vacuum chamber 24. Passing vertically through the pipe 116 is a valve-stem, 120, having a spring-pressed valve, 121, at its lower end, for closing the connection from the pipe 116 to the chamber 115. This valve-stem is actuated to open and close the vacuum valve 121 by means of a bell-crank lever, 122, which is actuated by a lever, 123, connected by a rod, 124, to the bell-crank, and having a roller, 125, at its lower end, bearing on a cam, 126, on the outside of the pillar.

Figure 16:
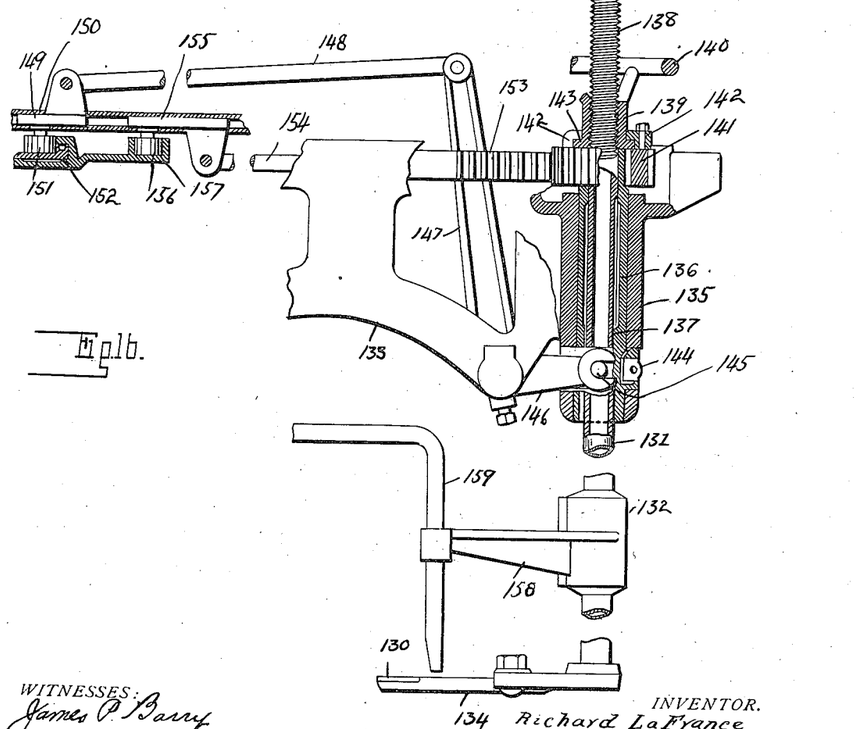
Fig. 16 is a side elevation of the bracket supported on the rotary frame, carrying the cut-off knife and showing in section the parts thereof, together with the operating mechanism for the cut-off knife.
Figure 17:
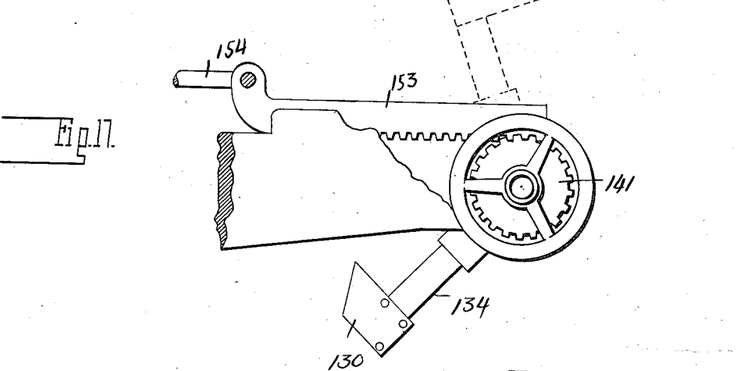
Fig. 17 is a top plan view of portions of Fig. 16.

The cut-off mechanism for severing the string of glass which depends from the lower end of the blank when it is gathered into the blank-mold, as is usual in such machines, consists of a knife which rocks across the bottom of the blank-mold as it lifts from the molten glass. This knife is shown as a blade, 130, secured to a rock-arm, 134, which is secured to the lower end of a shaft, 131. This shaft passes through a guide, 132, fastened to the dipping-head, and at its upper end is supported in a bracket, 133, which is secured to the post 7, extending at one side of the post, as clearly shown in Figs. 4, 5 and 16. This bracket 133 is provided at its outer end with a tubular sleeve, 135, within which is the tubular bushing, 136, through which the shaft 131 passes (Fig. 16). The bushing and shaft are keyed together at 137, so that they rotate in unison but so that the shaft may have an endwise adjustment in relation to the bushing. The shaft at its upper end is provided with a screw-threaded portion, 138, with which a nut, 139, engages, having any suitable means of rotation, such as a hand-wheel, 140. Keyed to the upper end of the bushing is a pinion, 141, having thereon lugs, 142, overhanging a flange, 143, at the lower end of the nut 139. The pinion is pinned to the bushing 136, or otherwise secured thereto, so that endwise movement imparted to the sleeve will move the pinion therewith and through the parts 142, 143, will also move the nut 139 and shaft 131. At the lower end of the bushing is a groove which engages a collar, 144, upon opposite sides of which are pins, 145, with which engage the forked arm 146 of a bell-crank lever journaled on the bracket 133, the other arm 147 of which is connected by a link, 148, with a slide, 149, engaging with a slide-way, 150, secured to the post 7 and having a roller, 151, engaging a cam-way, 152, on the pillar. Beside the pinion and engaging therewith in suitable guides formed in the bracket 133, is a rack-bar, 153, which at its inner end is connected by a link, 154, with a slide, 155, in the slide-way 150, and has a roller, 156, engaging a cam, 157, on the pillar. The bracket 133 is provided with a lateral extension, 158, through which projects a pipe, 159, connected with a suitable source of air supply, to blow air upon the knife when it is withdrawn from beneath the molds. These parts are so constructed that as the blank-mold lifts from the molten glass, having been filled by suction, in the well-known manner, the rack-bar will rotate the pinion 141 which will rock the shaft 131 and the rock-arm 134 across the lower end of the blank-mold and cut off the depending string of glass at the desired point in the operation; and while the knife is still beneath the blank-mold the cam 152 is so shaped as to rock the bell-crank, 146, 147, moving the shaft 131 downward so as to withdraw the knife vertically away from the blank-mold; when, by reverse motion of the rack-bar 153, after the knife has thus been lowered, it will rock away from beneath the blank-mold. This lowering of the knife directly away from the blank-mold is desirable as the scraping action which would occur if the knife were withdrawn laterally across the blank-mold, tends to draw the glass with it and distort or mar the glass in the bottom of the blank, and thus produce a scar or an imperfect bottom on the bottle when the same is blown.

This machine, as is usual in machines of this type, is provided with a sectional blow-mold, 160, traveling on a cam-way, 161, supported in the hinged frame, 162, with actuating devices, 163, operated by a slide, 164, a roller, 165, and cam, 166, for opening and closing the mold sections. This mechanism forms no part of my present invention, and I therefore have simply indicated it on the drawing. Its construction and operation will be well understood by reference to the patents to which I have previously referred at the beginning of this specification.

The vacuum chambers 24 and 27 are connected with a suitable vacuum pump by a pipe, 167; the chamber 28 is also connected with a suitable air-supply, under pressure; and the chamber 29 is connected with gas supply pipes which may lead from the chamber communicating with the chamber 29, with suitable gas-jets at any desired point in the machine which needs to be heated.

Figure 9:
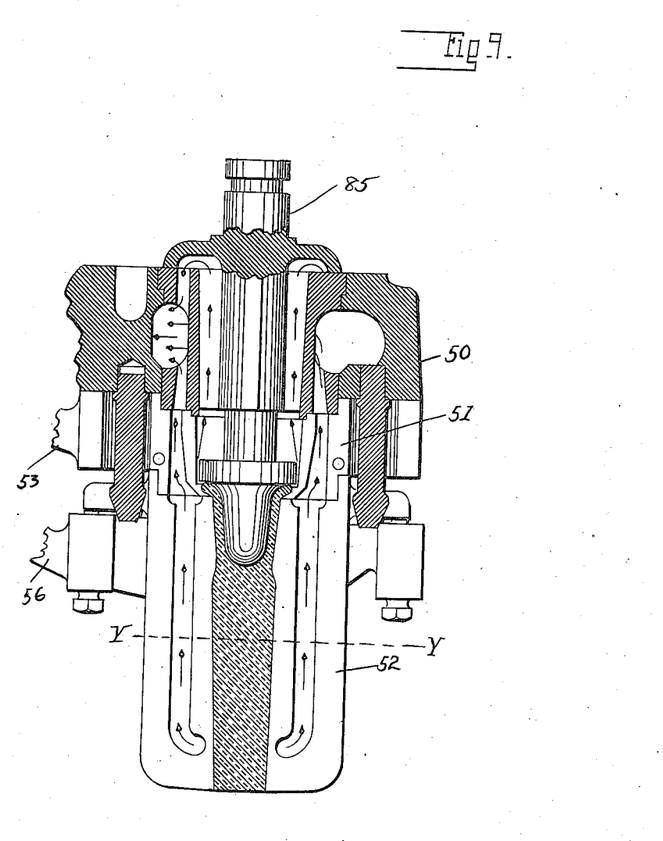
Fig. 9 is an enlarged section through the blow-head and blank-mold.
Figure 10:
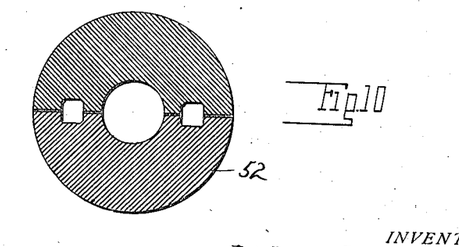
Fig. 10 is a cross-section on line Y—Y of Fig. 9.
Figure 11:
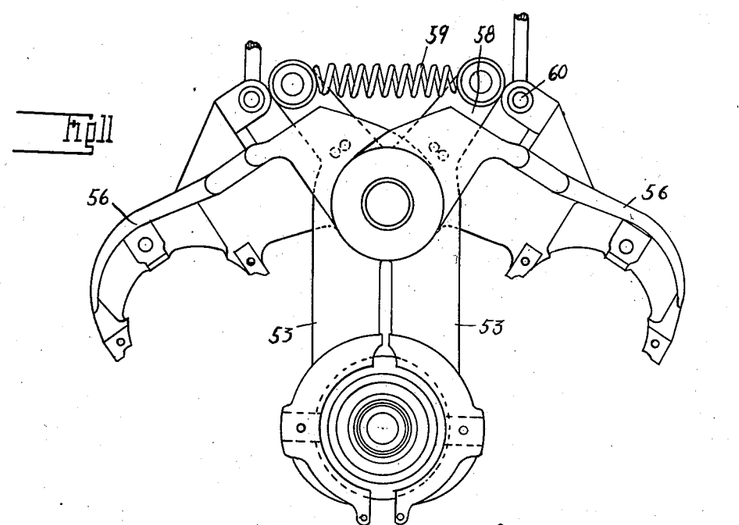
Figs. 11 and 12 are plan views illustrating different positions of the neck-mold and supporting arms and the body-blank-mold supporting arms, the blank-mold being omitted from the arms.

The parts being thus constructed, their operation is as follows: The machine being arranged so that in the course of the rotation the blank-molds will pass over a pool of glass, and the neck-molds and blank-molds being closed and in the position shown in Fig. 3 and Fig. 9, and the plunger-rod, 85, also being lowered as shown in those figures, as the blank-mold comes over the molten glass the dipping-head is lowered, through the cam 81 with which the roller 80 engages, which, through the bell-crank 75 effects this lowering until the bottom of the blank-mold touches, or is in close proximity to, the top of the molten glass. At this time, the vacuum valve 121 is opened by its cam 126 and the connection described, and by atmospheric pressure on the molten glass the blank and neck-molds are filled with the molten glass and the blank formed. Through the cam 81 and the connections described, the dipping-frame is raised as soon as the blank-mold is filled, and the cut-off knife is moved across the lower end of the blank-mold by the cam 157 and the connection actuating the rack-bar 153, which rocks the shaft 131 and the rock-arm 134 carrying the knife. The knife is then lowered away from the blank-mold before the reverse rocking movement is imparted to the arm 134 by means of the cam 152 and the connections described between the bell-crank 146, 147. The mold sections are then opened to the position shown in Fig. 11, by means of the cam 61, roller 62 engaging therewith, and the connections therefrom to the links 73 and the connecting links 72, 70 and 71. The plunger-rod 85 and the plunger 84 are then raised, by the cam 93 operating the slide 91, link 90, rocking gear segment 88 and rack-bar 87. As the plunger-rod is lifted the cam-way 105 rocks the valve-lever 102 and shifts the valve 100 into blowing position. At this time the blow-mold, riding upon its cam-way 161, has been lifted to inclose the blank and the sections thereof have been closed about the blank by means of the cam 166 operating the slide 164. The air-valve 111 is then opened by means of the cam 114 and the lever 112, and air is admitted to the interior of the blank to blow the bottle to finished form. When the bottle is blown and as it approaches the end of its circular travel, the blank-molds are opened still farther than shown in Fig. 11 to the position shown in Fig. 12; when, by means of the pin 60 striking the levers 58 of the neck-mold, the neck-mold is opened sufficiently to allow the bottle to be withdrawn therefrom. At this time, the bottle still being in the blow-mold and the cam-way 161 being inclined downward, the bottle in the blow-mold is lowered out of the way of the blank-molds and neck-molds. The blow-mold sections are then opened to drop out the bottle, and the blank and neck-molds are closed for repeating the operation described.

What I claim as my invention is:

1. In a glass gathering machine, the combination of the central pillar or frame, bearings therein, a guide frame supported on the bearing and rotating about the pillar, vertical guides on the guide frame, a dipping frame adapted to raise and lower on the guides of the guide frame, devices on the dipping frame adapted to be actuated during its travel, stationary cams on the pillar, horizontal guides on the rotating frame, slides in said guides, engaging the cams on the pillars, and hinged connecting rods from said slides to the parts to be actuated on the dipping frame.

2. The combination of the main frame, a revolving frame thereon traveling in a horizontal plane, a vertically movable dipping-frame on the revolving frame, a sectional gathering mold on the dipping frame, a stationary cam on the main frame, a guide on the revolving frame, a slide in the guide engaging the cam, a guide on the dipping frame, a slide thereon, a connecting member pivoted to the two slides, and an actuating connection from the slide on the dipping frame to the mold section, to actuate the same.

3. The combination of the main frame, a revolving frame thereon traveling in a horizontal plane, a dipping frame vertically movable on the revolving frame, a cam on the main frame, an actuating member on the revolving frame engaging said cam and a bell-crank lever on the revolving frame connected to said actuating member at one end and at the other end to the dipping-frame.

4. The combination of the main frame, a revolving frame thereon traveling in a horizontal plane, a dipping frame vertically movable on the revolving frame, a cam on the main frame, a slide on the revolving frame having an engagement with the cam, a pivoted connecting rod on the slide, a bell-crank lever on the revolving frame, to one end of which the connecting rod is pivoted, and a connection from the other end of the bell-crank lever to the dipping frame.

5. In a glass gathering machine, the combination of the rotating frame having vertical guides thereon, a dipping frame adapted to reciprocate on said guides, a horizontal bar secured to the lower end of said dipping frame and extending on both sides thereof, sectional molds pivoted to said bar, outwardly of the vertical guides, and a guide for the actuating devices for the mold sections, inwardly of said vertical guides.

6. In a glass gathering machine, the combination of the rotating frame, vertical guides thereon, a dipping frame adapted to move on said guides, a sectional neck-mold, a sectional body-blank mold, and arms to which said mold sections are connected, said arms being pivoted on a common pivotal center on the dipping frame.

7. In a glass gathering machine, the combination of the rotating frame having vertical guides, a dipping frame adapted to reciprocate on said guides, a sectional neck-mold and a sectional body-blank mold, and a single pivot, carried by the dipping frame, upon which the sections of the neck and body-blank molds are journaled.

8. In a glass gathering machine, the combination of the traveling frame, sectional neck and blank molds pivoted on a common pivotal center, and double supports for the blank-mold, above and below the support for the neck-mold.

9. In a machine of the kind described, a dipping frame, blank-mold sections, bifurcated arms supporting said sections, and neck-mold supporting arms pivoted on the same pivotal center between the bifurcations of the blank-mold arms.

10. In a machine of the kind described, the combination of the dipping frame, a lateral extension thereon, a pivot pin in the extension, and neck-mold supporting arms and blank-mold supporting arms supported on said pin.

11. In a machine of the kind described, the combination of the central pillar, the frame rotating about the pillar, posts at the outer edges of the rotating frame, a dipping frame having guides at its inner end engaging guide-ways on the posts, a vertical pivot on the dipping frame outwardly of the guides and neck and blank molds pivoted on said pin.

12. In a glass molding machine, the combination of the pivoted blank and neck mold supporting arms and means for actuating the neck-mold by the blank-mold arms.

13. In a glass molding machine, the combination of the pivoted blank-mold supporting arms, the pivoted neck-mold supporting arms, and means for opening the neck-mold by the blank-mold arms.

14. In a glass molding machine, the combination of the pivoted blank-mold supporting arms, the pivoted neck-mold supporting arms, a spring for normally holding the neck-mold sections closed, and lugs on the blank-mold arms, adapted to engage and move the neck-mold supporting arms to open position.

15. In a glass gathering machine, the combination of a stationary pillar, a frame rotating about the pillar, vertical guides on the rotary frame, a vertically movable dipping frame moving on said guides, the gathering mold carried by the dipping frame, a bracket on the traveling frame extending out adjacent to the mold, a cut-off knife carried by said bracket, and means to actuate the knife when the dipping frame is raised.

16. In a glass gathering machine, the combination of the traveling frame, the gathering mold carried thereby, a cut-off knife, means to actuate the knife to cut-off laterally across the mold opening, and to move the knife vertically away from the mold after the cut-off.

17. In a glass gathering machine, the combination of the traveling frame, the gathering mold carried thereby, a cut-off knife, a rock arm carrying the knife, a shaft on which the rock arm is supported and means for rocking the shaft and for raising and lowering it relatively to the gathering mold in its cutting position.

18. In a glass gathering and shaping machine, the combination of the traveling frame, the vertically movable dipping frame carried thereby, the plunger-bar, 85, sliding in vertical bearings on the dipping frame, the gear segment, 88, pivoted on the dipping frame, a rack bar on the plunger-bar with which the gear segment engages, and means for actuating the gear segment on the travel of the frame.

19. In a glass gathering and shaping machine, the combination of the traveling frame, the vertically movable dipping frame, the neck and blank molds carried thereby, a blow-mold traveling therewith, the plunger-rod, a gear segment engaging a rack bar on the plunger-rod, an air valve, a cam on the gear segment, and a lever engaging the cam at one end and the air valve at the other, for the purpose specified.

20. In a machine of the kind described, the combination of the cylindrical supporting pillar, a rotary frame adapted to turn about the same, a series of dipping-frames carried on the rotating frame, a separate counterweight for each dipping-frame, arranged within the pillar, and connections from the counterweights to the dipping-frames.

In testimony whereof I affix my signature in presence of two witnesses.

RICHARD LA FRANCE.

Witnesses:
T. H. MILLER,
K. F. RISSER.